US010152833B2

(12) United States Patent
Sauerteig et al.

(10) Patent No.: US 10,152,833 B2
(45) Date of Patent: Dec. 11, 2018

(54) METHOD FOR DETERMINING A DEFECTIVE COMPONENT OF A VEHICLE

(71) Applicant: Bayerische Motoren Werke Aktiengesellschaft, Munich (DE)

(72) Inventors: Thilo Sauerteig, Poing (DE); Felix Breiner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 41 days.

(21) Appl. No.: 14/950,468

(22) Filed: Nov. 24, 2015

(65) Prior Publication Data

US 2016/0148444 A1 May 26, 2016

(30) Foreign Application Priority Data

Nov. 25, 2014 (DE) .................. 10 2014 223 954

(51) Int. Cl.
*B60W 50/02* (2012.01)
*G07C 5/08* (2006.01)

(52) U.S. Cl.
CPC ....... *G07C 5/0808* (2013.01); *B60W 50/0205* (2013.01)

(58) Field of Classification Search
CPC ............ G07C 5/0808; B60R 16/0234; B60W 50/0205
USPC ....................................................... 701/29.7
See application file for complete search history.

(56) References Cited

U.S. PATENT DOCUMENTS

| 5,680,909 | A | 10/1997 | Lofy |
| 6,618,657 | B1 | 9/2003 | Geil et al. |
| 9,721,400 | B1* | 8/2017 | Oakes, III ............ G07C 5/0808 |
| 2004/0117081 | A1* | 6/2004 | Mori .................... G01S 5/02 701/1 |
| 2014/0356612 | A1* | 12/2014 | Sano .................... C08J 5/06 428/298.7 |
| 2015/0363983 | A1* | 12/2015 | Cunnings ............ G01M 17/007 701/29.1 |

FOREIGN PATENT DOCUMENTS

| DE | 199 17 207 A1 | 10/2000 | |
| DE | 100 56 413 A1 | 5/2002 | |
| DE | 102 17 031 A1 | 10/2003 | |
| DE | 10 2004 006 404 A1 | 9/2004 | |
| DE | 10 2005 026 517 A1 | 12/2006 | |
| DE | 102008016801 A1 * | 10/2009 | ......... G01M 17/007 |
| DE | 10 2008 013 780 B3 | 7/2010 | |
| DE | 10 2012 018 521 A1 | 3/2013 | |

OTHER PUBLICATIONS

Machine Translation of DE102008013780B3: Mietens, DE102008013780B3, Jul. 2010, German Patent Office.*

(Continued)

*Primary Examiner* — Nadeem Odeh
(74) *Attorney, Agent, or Firm* — Crowell & Moring LLP

(57) ABSTRACT

In order to determine a defective component of a vehicle, a defect of a first sensor system which is located at a first position in the vehicle is detected. A component, which is located between the first position and the outer edge of the vehicle and is, in particular, sensorless, of the vehicle is marked as being defective.

17 Claims, 2 Drawing Sheets

(56) References Cited

OTHER PUBLICATIONS

Machine Translation: Schulz, DE 102008016801 A1, Oct. 2009, German Patent Publication.*
Price, Sensors & Transmitters, Apr. 30, 2003, Christian Brothers University Lecture Notes <http://facstaff.cbu.edu/rprice/lectures/sensor.html>.*
M.R.E.S., Active vs. Passive Safety: What's the Difference?, Jan. 20, 2014, Mountain Regional Equipment Solutions <http://www.mountainregionaleq.com/blog/active-vs-passive-safety-whats-the-difference.php> (Year: 2014).*
German Search Report issued in corresponding German Application No. 10 2014 223 954.0 dated Jun. 16, 2015 with partial English translation (12 pages).

* cited by examiner

METHOD FOR DETERMINING A DEFECTIVE COMPONENT OF A VEHICLE

CROSS REFERENCE TO RELATED APPLICATIONS

This application claims priority under 35 U.S.C. § 119 from German Patent Application No. 10 2014 223 954.0, filed Nov. 25, 2014, the entire disclosure of which is herein expressly incorporated by reference.

BACKGROUND AND SUMMARY OF THE INVENTION

The present invention relates to a method for determining a defective component of a vehicle, to a diagnostic module and to a vehicle.

Accident damage to vehicles cannot be completely avoided even with the increasing use of driver assistance systems, even if the frequency and severity of accidents can frequently be reduced. Vehicles are typically of modular design, with the result that individual defective components of the vehicle can be exchanged. Components which are located further inside the vehicle can generally only be tested for defects after the removal of the outer bodywork parts. Before these components can then be repaired or exchanged, insurance companies often require expert appraisal thereof by an official appraisal expert. Accordingly, spare parts can also only be made available after a delay and the repair of the vehicle is delayed, which can adversely affect the satisfaction rating by vehicle owners.

DE 199 17 207 A1 discloses an emergency call device for vehicles which can output an emergency call message independently of damage to the on-board electronics as soon as a critical driving situation is detected by sensor systems of the vehicle. The sensor systems may detect, in particular, translational accelerations, rotational angle accelerations of the vehicle, changes in shape of the vehicle bodywork, braking processes and/or steering movements. An evaluation unit determines, on the basis of the sensor signals by use of threshold value decisions, whether a critical driving situation has come about and whether an accident has occurred owing to a critical driving situation. A method and a device for informing emergency services about accidents of a motor vehicle are also described in DE 10 2005 026 517 A1. A warning device for a vehicle having at least one sensor system for detecting an accident is also disclosed in DE 10 2004 006 404 A1.

In addition, DE 100 56 413 A1 discloses a diagnostic module for diagnosing a vehicle system. With the known diagnostic module, output signals of a system model are further processed taking into account a functional hierarchy and a component hierarchy. As a result of the further processing, information relating to the smallest exchangeable unit is available.

DE 102 17 031 A1 discloses a highly dynamic normal force-measuring device and strain-measuring device based on piezoelectric sensors. The known measuring device is intended, in particular, to improve the detection of an impact situation and an accident situation and on the basis thereof to optimize the triggering of active safety components, in particular airbags, seatbelt pretensioners and/or means which influence the movement dynamics of the motor vehicle. For this purpose piezoelectric sensors, in particular monoaxially oriented piezofoils, are used on externally located components of the vehicle. The provision of piezoelectric sensors on externally located components entails increased expenditure on fabrication and makes the vehicle more expensive without an immediately recognizable benefit for the purchaser.

Taking this as a basis, the present invention is based on the object of providing a method and a diagnostic module which permit a sensorless defective component to be determined on the basis of existing sensors.

According to the invention, this and other objects are achieved with the method and the diagnostic module according to embodiments of the invention.

A method for determining a defective component of a vehicle, in particular of a scooter, a motorcycle or a passenger car, wherein a defect of a first sensor system which is located at a first position in the vehicle is detected, and wherein a component, which is located between the first position and the outer edge of the vehicle and is, in particular, sensorless, of the vehicle is marked as being defective, can make it possible to mark components as being defective in an automated fashion without the components having to be provided with special sensors. In particular, in this context a vehicle component which is located on the shortest connecting line between the first position and the outer edge of the vehicle can be marked as being defective.

The term "marked as being defective" can be understood within the sense of this application as meaning, in particular, that the component is characterized as being defective in a database. This can occur, for example, by setting what is referred to as a flag. The database may be part of the vehicle here, in particular be implemented in a diagnostic module, or be made available externally in a background system. The database can contain here, in particular, at least one identification information item, which is assigned to the component, in particular a component number. For the marking as being defective, it is possible, for example, to assign the flag logically to the component number and/or to set it in a corresponding data record. It is also contemplated for the component itself to have a readable memory in which the defect information can be kept available.

In modern vehicles, driver assistance systems are used to relieve the burden on the driver of guiding the vehicle. The driver assistance systems require data from sensor systems in order, for example, to be able to determine the distance from an obstacle. The sensor systems, in particular the electronically diagnosable components thereof, can be located here at various positions of the vehicle. The functional capability of the sensor systems which are present on the basis of the driver assistance systems can be interrogated. In the case of an accident-related defect of a sensor system it is possible to infer that a further component which is located between the sensor system and the outer edge of the vehicle has also been damaged and has to be replaced when there is a repair. By way of the method, a plurality of components which are located between the sensor system and the outer edge of the vehicle can also be marked as being defective. The more driver assistance systems which are provided in a vehicle, and the more complex they are, the greater will also be the increase in the density of sensor systems whose failure can be detected. It is contemplated that according to one exemplary embodiment of the method for detecting a defective component, the detection of the defective first sensor system is triggered manually. However, it is also contemplated that the detection takes place auto for example after the occurrence of an unusual acceleration of the vehicle.

In a first embodiment of the method for determining a defective component of a vehicle, a defect of a second sensor system which is located at a second position in the vehicle is detected, and a component, which is lying on a straight line leading through the first position and the second position and is, in particular, sensorless, of the vehicle is marked as being defective. The use of a first sensor system and of a second sensor system can permit the reliability with which a component is marked as being defective to be increased.

One development of the method for determining a defective component of a vehicle provides for the defect of the second sensor system to be detected after the defect of the first sensor system, and for a component, lying on half of the straight line extending from the second position in the direction of the first position, of the vehicle to be marked as being defective. That component of the vehicle which is to be marked as being defective can, but must not necessarily, be located between the first and the second position but can also be located on the side of the first position facing away from the second position. In particular, if only a small number of sensor systems are installed in the vehicle, a component which is located on the shortest connecting path between the first sensor system and the outer edge of the vehicle does not necessarily have to be defective and marked as such. For example, it is contemplated for a first sensor system which is located in the right-hand vehicle half to be damaged by an accident from the left-hand side. The determination of the sequence of the defect of the first sensor system and of the second sensor system can permit a penetration direction of another party in an accident or of an obstacle in an accident into the vehicle to be determined. In particular, a penetration path can be determined and the components which are located along the penetration path can be marked as being defective.

According to a further exemplary embodiment of the method for determining a defective component of a vehicle, a component which is located between the first position and the second position is marked as being defective. This makes it possible for the position of the component to be marked as being defective to be determined more precisely.

In addition, one embodiment of the method for determining a defective component of a vehicle provides that a defect of a sensor system, or of the second sensor system, which is located at a position, or at the second position, in the vehicle is detected. A defect of a third sensor system which is located at a third position in the vehicle is detected. A component which is located inside the triangle described by the first position, the second position and the third position and is, in particular, sensorless, is marked as being defective. In other words, within the scope of this embodiment it is possible to have recourse to the second sensor system which has already been described with reference to the exemplary embodiments above. However, it is alternatively also possible for a second sensor system winch is independent of the developments of the method above to be used. The use of three positions can permit components which do not lie directly on the straight line between two sensor systems to be detected as being defective and marked accordingly.

According to another development of the method for determining a defective component of a vehicle, a defect of a sensor system, or of the second sensor system, which is located at a position, or at the second position, in the vehicle is detected. A defect of a sensor system, or of the third sensor system, which is located at a position, or at the third position, in the vehicle is detected. And, a defect of a fourth sensor system which is located at a fourth position in the vehicle is detected. A component which is located inside the tetrahedron described by the first position, the second position, the third position and the fourth position and is, in particular, sensorless, is marked as being defective. Taking into account components which are located inside a tetrahedron which is spanned by the four positions can reduce the risk that further components prove to be defective during a repair of the vehicle.

A further exemplary embodiment of the method for determining a defective component of a vehicle provides that a component which is fabricated from a composite-fiber-reinforced material is marked as being defective. Compared to components which are manufactured from conventional materials, components which are fabricated from composite-fiber-reinforced material can have a higher degree of strength and/or a reduced weight. The term "composite-fiber-reinforced material" can be understood to mean, for example, composite-fiber-reinforced plastic, in particular carbon-fiber-reinforced, aramid-fiber-reinforced and/or glass-fiber-reinforced plastic. The plastic can also be, in particular, epoxy-resin-based, polyester-resin-based plastic and/or thermoplasts, in particular polyamides. In the case of components which are fabricated from composite-fiber-reinforced materials it is possible for defects to be, under certain circumstances, more difficult to detect, therefore delaying a repair process. The proposed method can permit the advantages of the composite-fiber-reinforced material to be exploited without excessively large restrictions in the repair process having to be accepted.

According to another development of the method for determining a defective component of a vehicle, an information item relating to the component which is marked as being defective is transmitted in a wireless fashion to a background system, in particular a background computer system, which is separate from the vehicle. The wireless transmission of an information item relating to the component which is marked as being defective to a background system which is separate from the vehicle, also referred to as a backend, can permit spare parts for the repair of the vehicle to be made available without delay. Likewise, the information can be used to compare defects of various vehicles and to derive an improved crash structure of the vehicle therefrom. It is also contemplated to transmit information relating to a detected defect of the first, second, third and/or fourth sensor system in a wireless fashion to a background system and to mark the component, in particular the sensorless component, as being defective using the background system. The computational capacity which is required to carry out the method, but is generally not required, therefore does not have to be kept available in the vehicle.

In addition, according to one embodiment of the method for determining a defective component, one of the first sensor system, the second sensor system, the third sensor system and/or the fourth sensor system comprises an ultrasonic sensor system, a position sensor system, an acceleration sensor system, a radar sensor system, a temperature sensor system, a filling level sensor system and/or a camera sensor system.

A diagnostic module which is configured to carry out one of the methods described above can lead to faster and more reliable detection of a defective component.

A vehicle which has a first sensor system and a diagnostic module which is described above can be repaired more quickly and more cost-effectively after an accident.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
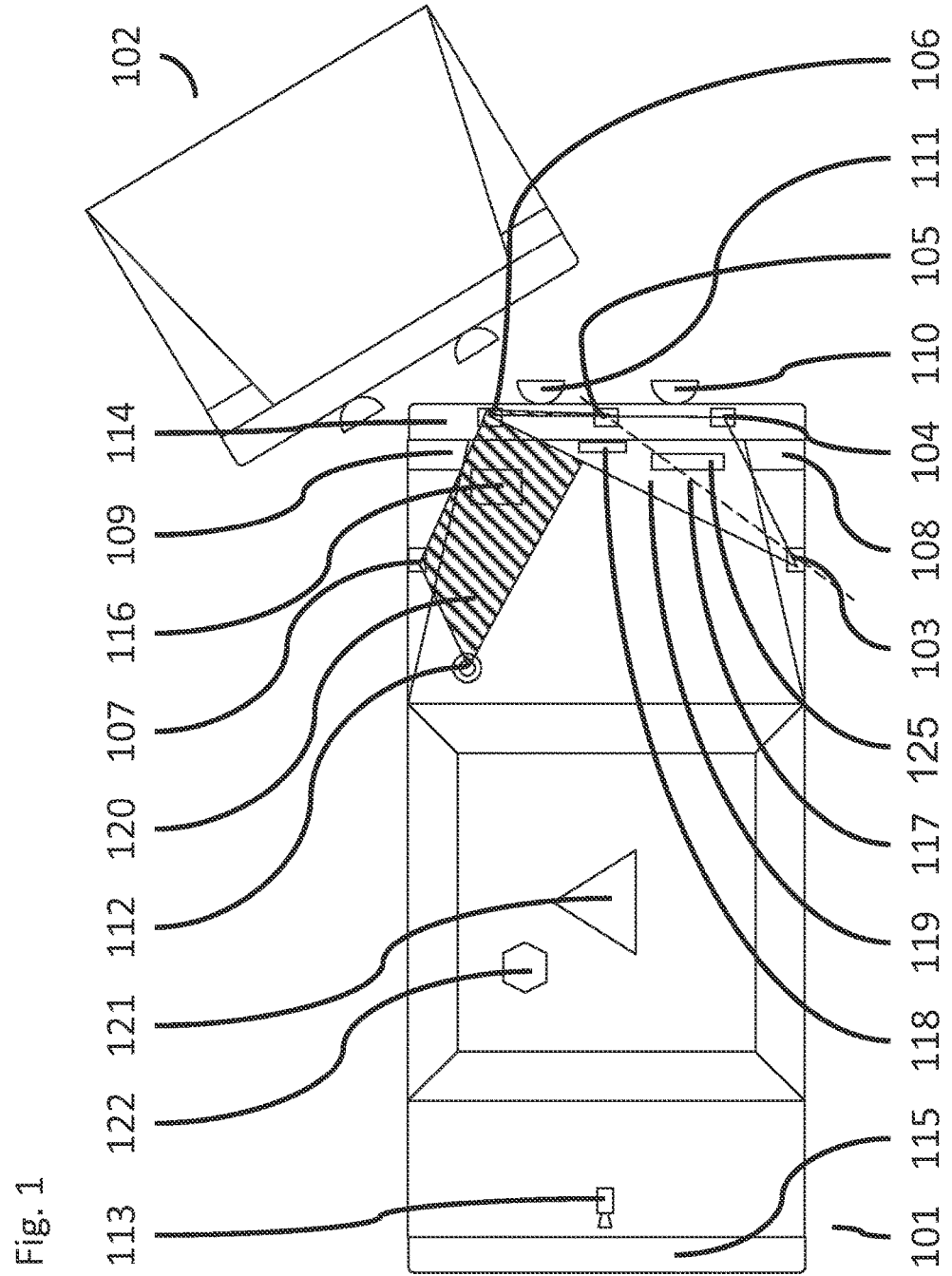
FIG. 1 is a schematic diagram illustrating a first vehicle and a second vehicle.

FIG. 1 is a schematic illustration of an accident situation between a first vehicle 101 and a second vehicle 102, in which accident situation the first vehicle 101 is damaged. The first vehicle 101 has a plurality of sensor systems 103 to 113. The sensor systems 103 to 107 can include, for example, ultrasonic sensors and be assigned to a distance warning system, also referred to as a park distance control (PDC). The distance warning system can warn a driver of the vehicle, when parking, of obstacles which are, under certain circumstances, not located in his or her field of vision, or can indicate the distance from these obstacles visually and/or acoustically. The sensor systems 108, 109 and 110, 111 are assigned to the main headlights or the fog lights of the vehicle 101. They can monitor, for example, whether the lighting means, i.e. the halogen lamps, LED modules, laser modules or gas discharge lamps, are still functionally capable. The sensor system 112 can be used, for example, to monitor the filling level of the container for the window cleaning fluid. The sensor system 113 can be configured, for example, as a reverse camera and can provide the driver with better rear vision when parking with the result that the driver can park even in relatively tight parking spaces.

Furthermore, the vehicle includes a plurality of components 114 to 116, 125 which can be damaged in the event of an accident to the vehicle 101 and may need to be replaced within the scope of a repair. The components include, for example, bumpers 114 and 115, radiator components 118 and 125, and battery 116.

In a first case it is possible, for example, for a defect of a first sensor system which is located at a first position in the vehicle 101, for example the sensor system 113, to be detected, and for a component 115, located between the first position and the outer edge of the vehicle 101, of the vehicle to be marked as being defective. In other words, a defect of the bumper 115 can be detected without the latter itself having to be provided with a sensor system. The bumper 115 can, for reasons of weight, be fabricated, for example, from a composite-fiber-reinforced material, in particular from a carbon-fiber-reinforced plastic. A defect of a component which is, in particular, surface-coated and is fabricated from a composite-fiber-reinforced material may be difficult to detect visually. The method described may permit a defect of this component nevertheless to be reliably detected.

In another case, a defect of a first sensor system which is located at a first position in the vehicle 101 can be detected, for example of the sensor system 105, and a defect of a second sensor system which is located at a second position in the vehicle, for example of the sensor system 103, can be detected. A component 125, located on a straight line 117 leading through the first position and the second position, of the vehicle 101 can be marked as being defective. In a comparable fashion, a defect of a first sensor system 103, of a second sensor system 104 and of a third sensor system 106 can be detected. In this case it is possible for a component 118 which lies inside the triangle 119 to be detected as being defective. Finally, the lack of functional capability of four sensor systems 105, 106, 107, 112 can also be detected, and on this basis it is possible to detect a defect of the component 116 which is located inside the tetrahedron 120 described by the respective positions.

The detection of the defects of the sensor systems 103 to 113 and the marking of the defective components 114 to 116 and 125 can be performed, in particular, by way of a diagnostic module 121 which can communicate with a communication module 122 with a background computer system (not illustrated in FIG. 1). The diagnostic module may comprise a processor programmed to execute software instructions stored on a computer-readable medium, resulting in the associated functionalities described herein.

Figure 2:
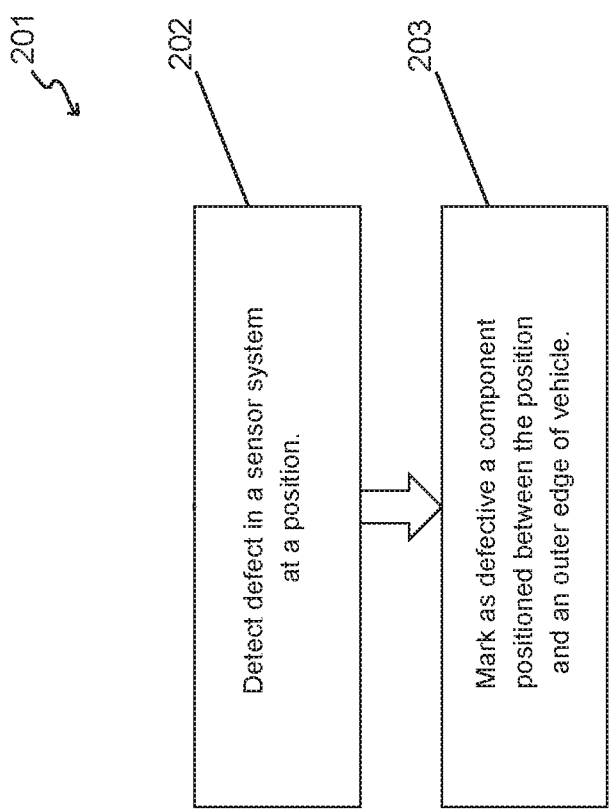
FIG. 2 is a flow chart of an exemplary embodiment of the method according to the invention.

FIG. 2 shows, by way of example, a flow chart 201 which can be run through when a method for determining a defective component of a vehicle is executed. In a first step 202, a defect of a first sensor system which is located at a first position in the vehicle is detected. Then, in a second step 203 a component of the vehicle which is located between the first position and the outer edge of the vehicle is marked as being defective.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for determining defective components of a vehicle, the system comprising:
   a first sensor system located at a first position in the vehicle;
   a sensorless component located between the first position and an outer edge of the vehicle; and
   a diagnostic module that detects that the first sensor system is functionally defective, and in response to the detection marks the sensorless component as defective in a database.

2. The system according to claim 1, further comprising:
   a second sensor system located at a second position in the vehicle, wherein the diagnostic module detects that the second sensor system is also functionally defective, and in response to the detection marks the sensorless component as defective in the database, and
   wherein the sensorless component lies on a straight line that extends through the first position and the second position.

3. The system according to claim 2, wherein the functional defect of the second sensor system is detected after the functional defect of the first sensor system, and the sensorless component lies on at least one-half of the straight line.

4. The system according to claim 2, wherein the sensorless component is located between the first sensor system and the second sensor system.

5. The system according to claim 2, wherein the sensorless component is a composite-fiber-reinforced component.

6. The system according to claim 2, wherein the first sensor system is associated with a first driver assistance system, and the second sensor system is associated with a second driver assistance system.

7. The system according to claim 1, further comprising:
   a second sensor system located at a second position in the vehicle; and
   a third sensor system located at a third position in the vehicle, wherein the diagnostic module detects that the second and third sensor systems are also functionally defective, and in response to the detection marks the sensorless component as defective in the database, wherein the sensorless component is located inside a triangular area defined by the first position, the second position, and the third position.

8. The system according to claim 7, wherein the sensorless component is a composite-fiber-reinforced component.

9. The system according to claim 7, wherein the first sensor system is associated with a first driver assistance system, the second sensor system is associated with a second driver assistance system, and the third sensor system is associated with a third driver assistance system.

10. The system according to claim 1, further comprising:
a second sensor system located at a second position in the vehicle;
a third sensor system located at a third position in the vehicle; and
a fourth sensor system located at a fourth position in the vehicle, wherein the diagnostic module detects that the second, third and fourth sensor systems are also functionally defective, and in response to the detection marks the sensorless component as defective in the database,
wherein the sensorless component is located inside a tetrahedral volume formed by the first position, the second position, the third position, and the fourth position.

11. The system according to claim 10, wherein the sensorless component is a composite-fiber-reinforced component.

12. The system according to claim 10, wherein the first sensor system is associated with a first driver assistance system, the second sensor system is associated with a second driver assistance system, the third sensor system is associated with a third driver assistance system, and the fourth sensor system is associated with a fourth driver assistance system.

13. The system according to claim 1, wherein the sensorless component is a composite-fiber-reinforced component.

14. The system according to claim 1, wherein the diagnostic module wirelessly transmits information relating to the sensorless component marked as being defective from the vehicle to a background system separate from the vehicle.

15. The system according to claim 1, wherein the first sensor system is associated with a first driver assistance system.

16. A processor programmed via software instructions stored on a non-transitory processor-readable storage medium such that when executed by the processor causes the processor to:
detect a functional defect of a first sensor system located at a first position in a vehicle; and
in response to the detection, mark in a database as defective a sensorless component located between the first position and an outer edge of the vehicle.

17. A vehicle, comprising:
a first sensor system located at a first position in the vehicle; and
a diagnostic module comprising a processor programmed to: detect a functional defect of the first sensor system, and, in response to the detection, mark in a database as defective a sensorless component located between the first position and an outer edge of the vehicle.

* * * * *